(12) United States Patent
Keck, II

(10) Patent No.: US 10,766,426 B2
(45) Date of Patent: Sep. 8, 2020

(54) MODULAR ROOF RAIL COVER

(71) Applicant: Dura Operating, LLC, Auburn Hills, MI (US)

(72) Inventor: Kenneth Keck, II, Clinton Township, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 16/056,963

(22) Filed: Aug. 7, 2018

(65) Prior Publication Data

US 2020/0047677 A1   Feb. 13, 2020

(51) Int. Cl.
*B60R 9/00* (2006.01)
*B60R 9/04* (2006.01)

(52) U.S. Cl.
CPC ..................... *B60R 9/04* (2013.01)

(58) Field of Classification Search
CPC ........................................ B60R 9/04
USPC ........................................ 224/325
See application file for complete search history.

(56) References Cited

U.S. PATENT DOCUMENTS

| | | | | |
|---|---|---|---|---|
| 4,343,419 A * | 8/1982 | Mareydt | ................... | B60R 9/04 224/326 |
| 4,767,040 A * | 8/1988 | Miller | ..................... | B60R 9/04 224/325 |
| 4,911,349 A * | 3/1990 | Miller | ..................... | B60R 9/04 224/309 |
| 6,415,970 B1 * | 7/2002 | Kmita | ..................... | B60R 9/04 224/309 |
| 6,564,433 B2 * | 5/2003 | Nagasawa | .............. | B60R 13/04 24/289 |
| 7,004,535 B1 * | 2/2006 | Osterberg | .............. | B60R 13/04 296/203.03 |
| 7,029,060 B1 * | 4/2006 | Osterberg | .............. | B60R 13/04 296/203.03 |
| 8,056,783 B2 * | 11/2011 | Hirano | ..................... | B60R 9/04 224/309 |
| 9,352,696 B2 | 5/2016 | Gorey et al. | | |
| 2006/0049322 A1 * | 3/2006 | Hirano | ..................... | B60R 9/04 248/237 |
| 2008/0083800 A1 * | 4/2008 | Mathew | ................... | B60R 9/04 224/326 |
| 2010/0288807 A1 * | 11/2010 | Neu | ......................... | B60R 9/04 224/309 |
| 2014/0131406 A1 * | 5/2014 | Jutila | ..................... | B60R 9/058 224/321 |
| 2017/0349107 A1 * | 12/2017 | Tough | .................... | B60R 9/045 |
| 2019/0071031 A1 * | 3/2019 | Sharron | .................. | B60R 9/04 |

FOREIGN PATENT DOCUMENTS

| CN | 10745317 A | 12/2017 |
|---|---|---|
| WO | 2014016919 A1 | 1/2014 |
| WO | 2015085431 A1 | 6/2015 |

* cited by examiner

*Primary Examiner* — Peter N Helvey
(74) *Attorney, Agent, or Firm* — Vivacqua Crane PLLC

(57) ABSTRACT

A roof rail connectable to a roof of a vehicle includes a substrate connected to the roof of the vehicle, and a modular cover having a first cover connected to the substrate and a second cover connected to the substrate, wherein the modular cover covers the substrate.

28 Claims, 7 Drawing Sheets

MODULAR ROOF RAIL COVER

FIELD

The invention relates generally to a modular cover for a roof rail, and more particularly to a modular cover having multiple portions that connect together to vary the length of the modular cover.

BACKGROUND

The statements in this section merely provide background information related to the present disclosure and may or may not constitute prior art.

To increase the cargo capacity of a motor vehicle, a crossbar and rail assembly may be installed on the roof of the motor vehicle. Cargo may be secured to the crossbar and rail assembly which acts as a universal attachment point between the motor vehicle and the cargo. Examples of cargo include ski or snowboards, bikes, cargo cages, or cargo containers, to name but a few. The crossbar and rail assembly is typically attached directly to the roof panel of the motor vehicle.

The roof rails are typically long parts, and thus require large injection mold tools and presses to be manufactured. The cost of the large tools and presses is higher compared to smaller tools and presses. Also, vehicles have varying lengths, so each vehicle model requires separate roof rail tooling, at great expense. To reduce the tooling and press costs and allow roof rails parts, including the cover, to be used across multiple vehicle types, a new and improved design for a cover for a roof rail is desirable.

SUMMARY

According to several aspects, a roof rail connectable to a roof of a vehicle includes a substrate connected to the roof of the vehicle, and a modular cover having a first cover connected to the substrate and a second cover connected to the substrate, wherein the modular cover covers the substrate.

In one aspect, the first cover includes a first distal end of the roof rail and the second cover is a central portion of the roof rail.

In another aspect, the first cover and the second cover have a first overlap joint.

In another aspect, the first cover includes a lower recess of the first overlap joint and the second cover includes an upper recess of the first overlap joint to receive the lower portion of the first overlap joint.

In another aspect, an adhesive tape is disposed on the lower recess of the first overlap joint.

In another aspect, the modular cover further comprises a third cover which includes a second distal end of the roof rail.

In another aspect, the second cover and the third cover have a second overlap joint.

In another aspect, the third cover includes a lower recess of the second overlap joint and the second cover includes an upper recess to receive the lower portion of the second overlap joint.

In another aspect, an adhesive tape is disposed on the lower recess of the second overlap joint.

In another aspect, the substrate includes a first portion connected to a second portion by a first connection feature.

In another aspect, the substrate further includes a third portion connected to the second portion by a second connection feature.

In another aspect, the first cover and the second cover define a window area, and the roof rail further comprises a decorative strip positioned behind the window area, wherein the outer decorative strip is connected to the modular cover.

In another aspect, the decorative strip faces outward from the vehicle and the modular cover extends beyond ends of the window area.

In another aspect, the modular cover overlaps a portion of the outer decorative strip in a vertical direction relative to the vehicle.

In another aspect, the outer decorative strip is metal and has a continuous cross-sectional shape along a length of the outer decorative strip.

In another aspect, the outer decorative strip includes an inward facing, upper open edge and an inward facing, lower open edge, and the roof rail includes a connector that engages the upper open edge and the lower open edge and connects the outer decorative strip to the modular cover.

In another aspect, the connector includes a rib that engages one of the upper open edge and the lower open edge and includes a biasing member having a central portion that engages the other of the upper open edge and the lower open edge.

In another aspect, the connector includes a lower rib that engages the lower open edge and an upper rib that engages the upper open edge.

In another aspect, the connector includes a flange for receiving a fastener that connects the modular cover to the connector.

In another aspect, an inner cover is connected to the substrate facing inwardly relative to the vehicle.

In another aspect, the inner cover extends vertically from the roof of the vehicle to an upper edge of the modular cover.

In another aspect, the substrate includes a locator and the inner cover includes a slot, and wherein the locator is disposed through the slot to align the inner cover with the substrate.

In another aspect, the substrate includes slots on a top portion thereof and the first cover and the second cover each includes a rib having a spring clip, wherein the ribs and spring clips are disposed though the slots to connect the modular cover to the substrate.

According to several other aspects, a roof rail connectable to a roof of a vehicle includes a substrate connected to the roof of the vehicle, a modular cover having a first cover connected to the substrate and a second cover connected to the substrate, wherein the modular cover covers the substrate, an outer decorative strip connected to the modular cover, the outer decorative strip including a downward facing, upper edge and an upward facing, lower edge, and a connector that engages the downward facing, upper edge and the upward facing, lower edge and connects the outer decorative strip to the modular cover.

In one aspect, the connector includes a rib that engages one of the downward facing, upper edge and the upward facing, lower edge and includes a biasing member having a central portion that engages the other of the downward facing, upper edge and an upward facing, lower edge.

In another aspect, the connector includes a lower rib that engages the upward facing, lower edge and an upper rib that engages the downward facing, upper edge.

In another aspect, the connector includes a flange for receiving a fastener that connects the modular cover to the connector.

According to still several other aspects, a roof rail connectable to a roof of a vehicle includes a modular substrate connected to the roof of the vehicle, and a modular cover having a first cover connected to the substrate, a second cover connected to the substrate, and a third cover connected to the substrate, wherein the first cover includes a first distal end of the roof rail, the second cover is a central portion of the roof rail, and the third cover includes a second distal end of the roof rail, wherein the first cover and the second cover have a first overlap joint and the second cover and the third cover have a second overlap joint, wherein the first cover includes a lower portion of the first overlap joint and the second cover includes a recess of the first overlap joint to receive the lower portion of the first overlap joint, and wherein the third cover includes a lower portion of the second overlap joint and the second cover includes a recess to receive the lower portion of the second overlap joint.

In one aspect, an outer decorative strip is connected to the modular cover, the outer decorative strip including a downward facing, upper edge and an upward facing, lower edge. A connector engages the downward facing, upper edge and the upward facing, lower edge and connects the outer decorative strip to the modular cover.

In another aspect, the connector includes a rib that engages one of the downward facing, upper edge and the upward facing, lower edge and includes a biasing member having a central portion that engages the other of the downward facing, upper edge and the upward facing, lower edge.

In another aspect, the connector includes a lower rib that engages the upward facing, lower edge and an upper rib that engages the downward facing, upper edge.

In another aspect, the connector includes a flange for receiving a fastener that connects the modular cover to the connector.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
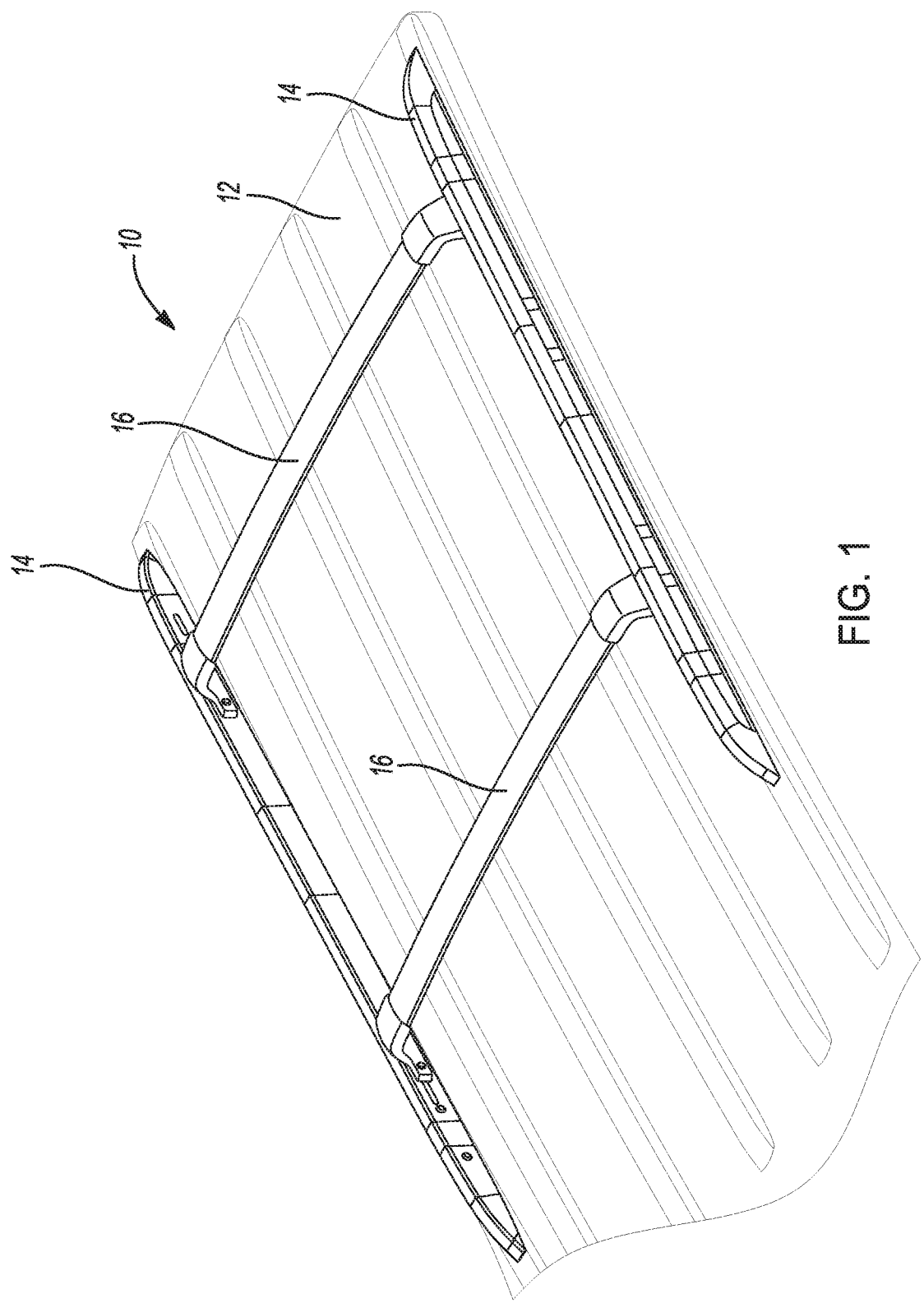
FIG. 1 is a front, perspective view of a roof rail assembly having a modular cover according to aspects of the present disclosure.

With reference to FIG. 1, a roof rail assembly according to aspects of the present disclosure is generally indicated by reference number 10. The roof rail assembly 10 includes a modular substrate that will be described below. The roof rail assembly 10 is attachable to a roof 12 of a motor vehicle. The roof 12 may have various sizes, shapes, lengths, contours, etc., without departing from the scope of the present disclosure. The roof rail assembly 10 generally includes a pair of roof rails 14 and a pair of crossbars 16. The roof rails 14 are disposed on and connected to the roof 12 and are spaced apart approximately parallel to one another. In this context, the term "approximately" is known to those skilled in the art. Alternatively, the term "approximately" may be read to mean plus or minus 15 degrees from parallel. The crossbars 16 are connected at each end to one of the roof rails 14 to provide a support frame for cargo, bikes, baskets, or any other object to be placed on the roof 12 of the motor vehicle. In the example provided, each of the roof rails 14 are substantially identical, and therefore only one roof rail 14 will be described below.

Figure 2:
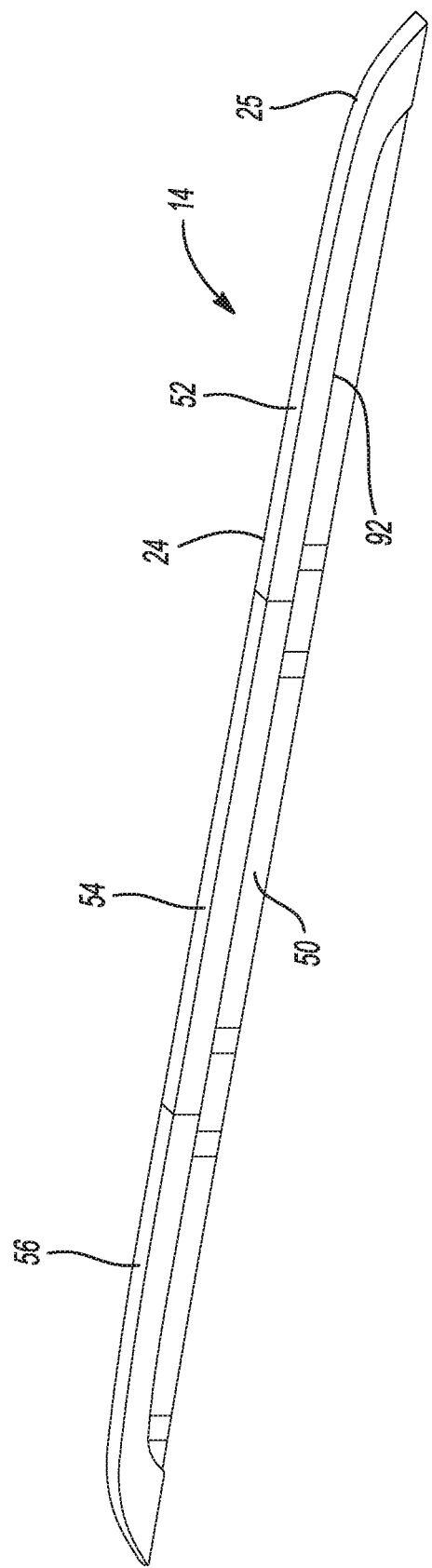
FIG. 2 is an outer, perspective view of a roof rail.
Figure 3:
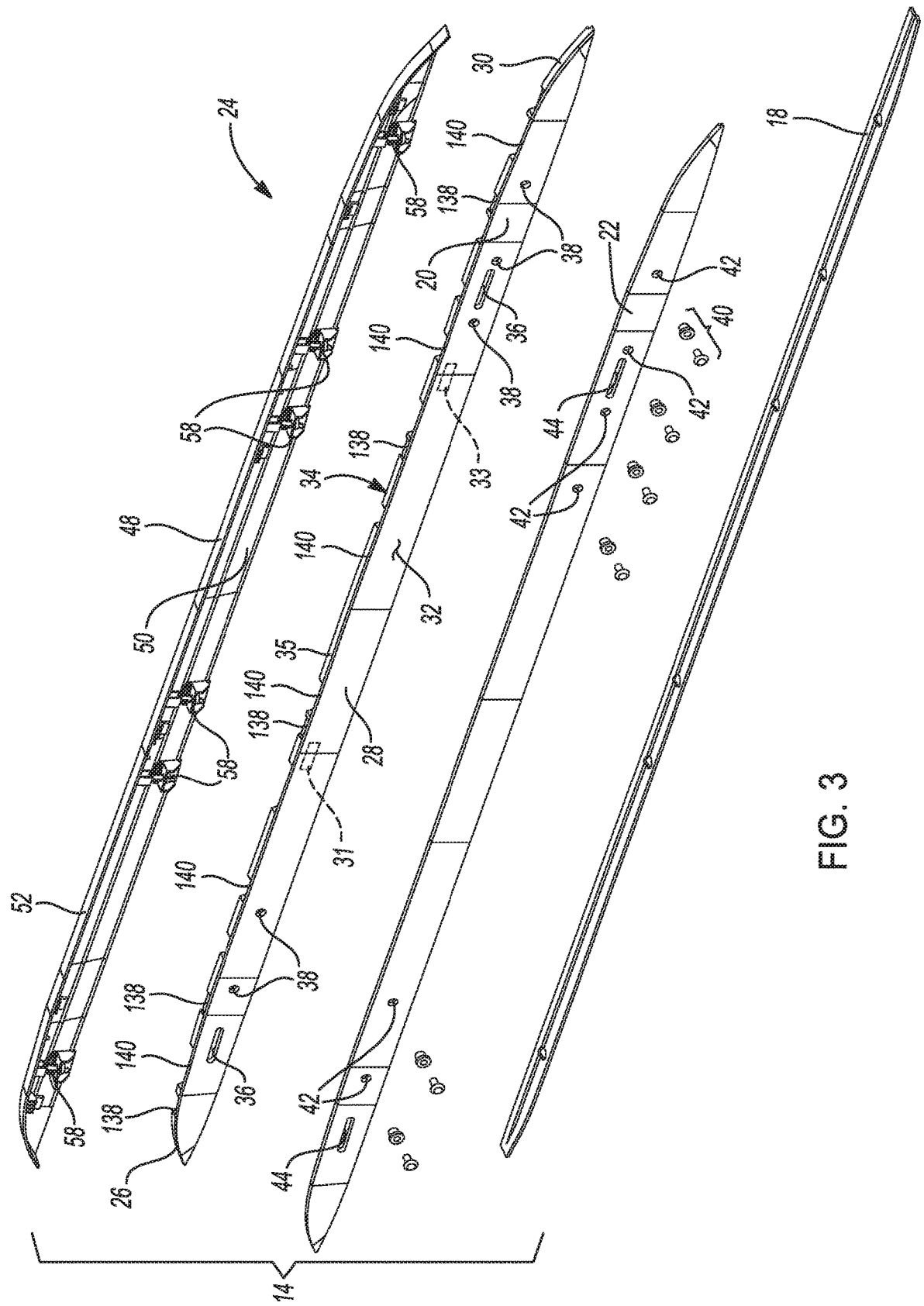
FIG. 3 is an inner, exploded perspective view of the roof rail.

With reference to FIGS. 2 and 3, the roof rail 14 generally includes a pad seal 18, a substrate 20, an inner cover 22, and a modular outer cover assembly 24. The substrate 20 is connectable to the roof 12. The inner cover 22 and modular outer cover assembly 24 attach to the substrate 20. The pad seal 18 is disposed between the substrate 20 and the roof 12 of the motor vehicle and provides padding to protect the roof 12 and sealing around the connection points between the substrate 20 and the roof 12. The pad seal 18 is preferably made of a thermoplastic elastomer, thought various materials may be employed.

The substrate 20 provides the support for the crossbars 16 to the roof 12. The substrate 20 is preferably modular, The substrate 20 generally includes a first portion 26 configured as a first distal end of the roof rail 14, a second portion 28 configured as a center portion of the roof rail 14, and a third portion 30 configured as a second distal end of the roof rail 14. The first portion 26 is connected to the second portion 28 by a first connection feature 31. The second portion 28 is connected to the third portion by a second connection feature 33. The substrate 20 also includes an inner surface 32 and an outer surface 34, and a top surface 35. The inner surface 32 includes locators 36 that extend therefrom and holes 38 for receiving rivet-nuts 40.

The inner cover 22 is connectable to the inner surface 32 of the substrate 20 and is configured to provide a decorative and resilient cover. The inner cover 22 is a roll form or stamped piece made of stainless steel or other decorative but strong material. The inner cover 22 includes rivet holes 42 and guide slots 44 formed therein. The guide slots 44 are configured to receive the locators 36 of the substrate 20 to locate the inner cover 22 on the substrate 20. The rivet-nuts 40, or any other suitable fastener, are disposed though the rivet holes 42 of the inner cover 22 and the holes 38 in the substrate 20 to secure the inner cover 22 to the substrate 20.

Figure 4:
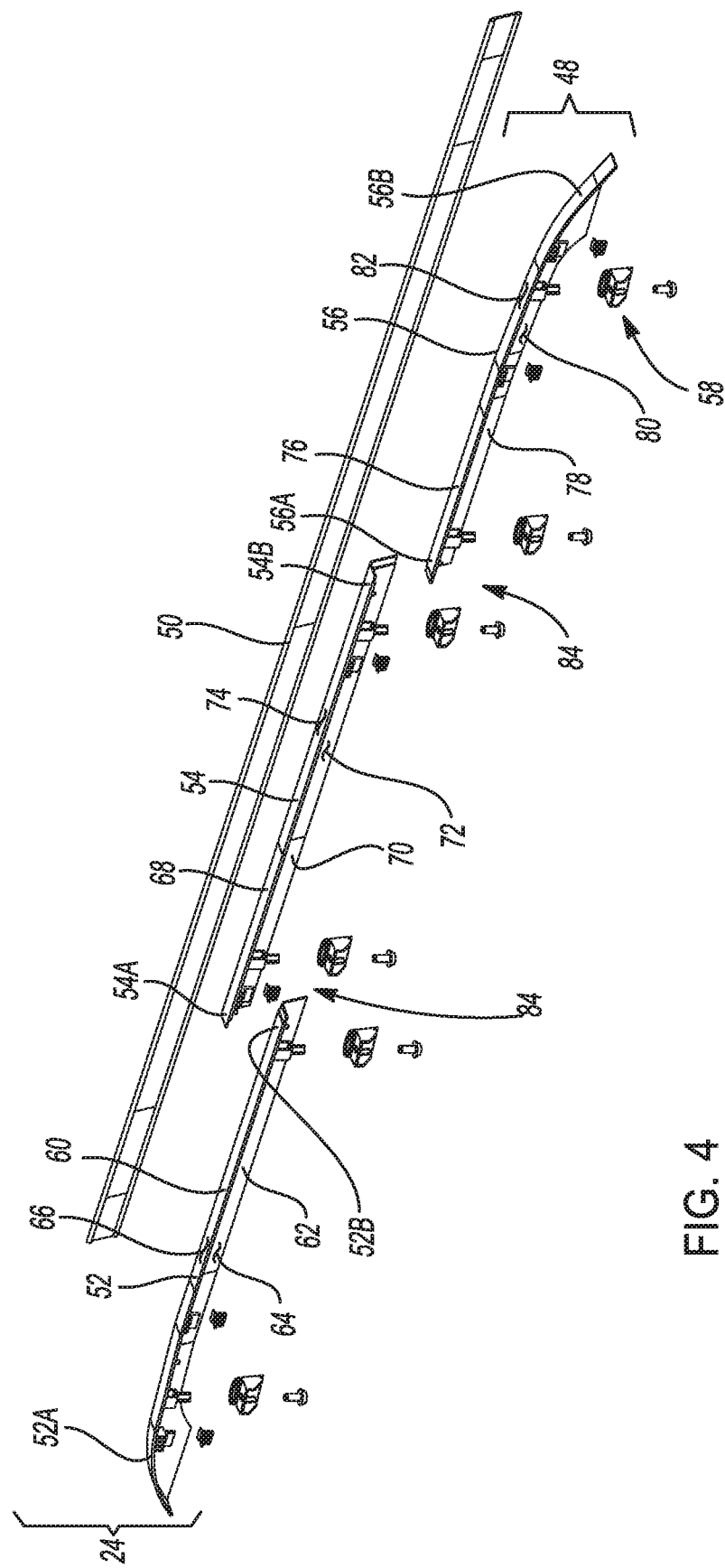
FIG. 4 is an inner, exploded perspective view of a outer cover assembly used with the roof rail.

Turning now to FIG. 4, and with continued reference to FIGS. 2 and 3, the modular outer cover assembly 24 is connectable to the substrate 20 and is configured to provide a decorative and resilient cover to the outer surface 34 and the top surface 35 of the substrate 20. The modular outer cover assembly 24 generally includes a modular cover 48 and an outer decorative strip 50. The modular cover 48 includes two or more covers that, when connected, vary the length of the modular outer cover assembly 24.

In the example provided, the modular cover 48 includes a first cover 52 connected to a second cover 54 connected to a third cover 56. However, it should be appreciated that the modular cover 48 may have various arrangements of the covers 52, 54, 56 without departing from the scope of the present disclosure. For example, the modular cover 48 may use just the first cover 52 connected the second cover 54, or the first cover 52 connected with the third cover 56, or the first cover 52 connected to a plurality of serially connected second covers 54 which may or may not connect to the third cover 56. Thus, the length of the modular cover 48 may be tailored to the needs of the roof 12 of the motor vehicle to which it is installed. The decorative strip 50 is connected to the covers 52, 54, 56 by one or more connectors 58, as will be described below.

The first cover 52 includes a curved, aerodynamic first distal end 52A and an open end 52B. The first cover 52 thus is configured as a forward or rear section of the roof rail 14. The first cover 52 includes a top wall 60 and a side wall 62. The top wall 60 and side wall 62 each have an inner surface 64 and an outer surface 66.

The second cover 54 includes a first open end 54A and a second open end 54B. Thus, the second cover 54 is configured as a central portion of the roof rail 14. The second cover 54 includes a top wall 68 and a side wall 70. The top wall 68 and side wall 70 each have an inner surface 72 and an outer surface 74.

The third cover 56 includes an open end 56A and a curved, aerodynamic second distal end 56B. The third cover 56 thus is configured as a forward or rear section of the roof rail 14. The third cover 56 includes a top wall 76 and a side wall 78. The top wall 76 and side wall 78 each have an inner surface 80 and an outer surface 82. Each of the covers 52, 54, 56 are connected to one another at the open ends 52B, 54A, 54B, 56A by an overlap joint 84.

Figure 5:
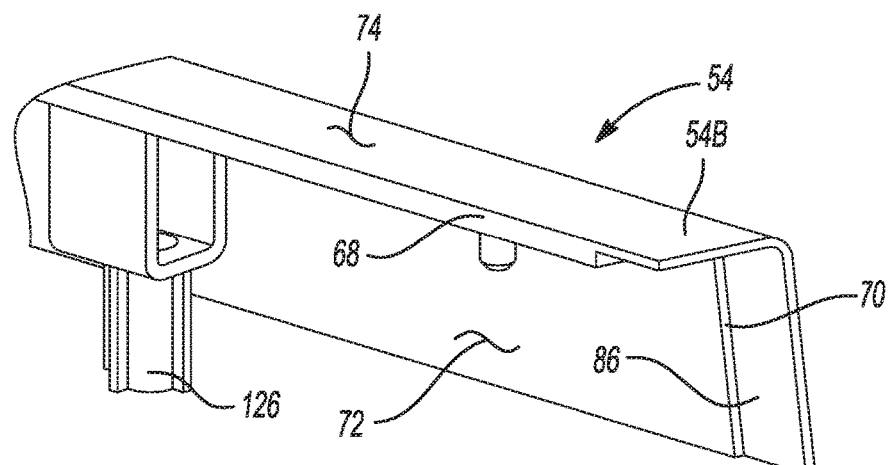
FIG. 5 is an inner, exploded perspective view of a portion of the modular cover.

With reference to FIG. 5, the overlap joint 84 will be described in greater detail with respect to the second cover 54 and the third cover 56. It should be appreciated that the overlap joint 84 between the first cover 52 and the second cover 54 is identical. The overlap joint 84 includes an upper recess 86 formed in the inner surface 72 of the top wall 68 and the side wall 70 of the second cover 54. The upper recess 86 thus results in a reduced thickness of the walls 68, 70 at the second open end 54B. The overlap joint 84 also includes a lower recess 88 formed in the outer surface 82 of the top wall 76 and the side wall 78 of the third cover 56. The lower recess 88 thus results in a reduced thickness of the walls 76, 78 at the first open end 56A. The recesses 86, 88 are sized to match one another and when joined the lower recess 88 fits within the upper recess 86 to create an area with a wall thickness equal to the thickness of the top walls 68, 76 and side walls 70, 78. An adhesive tape 90 is preferably disposed on the lower recess 88 to adhere the second cover 54 to the third cover 56.

Returning to FIG. 2, the covers 52, 54, 56 of the modular cover 48 each cooperate to define a window area 92 in the side walls 62, 70, 78 through which the decorative strip 50 is visible when viewed on an outer side of the roof rail 14. The decorative strip 50 is positioned behind or inwardly of the modular cover 48. Thus, the decorative strip 50 faces outward from the vehicle and the modular cover 48 extends beyond ends of the window area 92 such that the ends of the decorative strip 50 are hidden or covered. In addition, the modular cover 48 overlaps a portion of the decorative strip 50 in a vertical direction relative to the vehicle such that an upper edge of the decorative strip 50 is hidden or covered.

Figure 6:
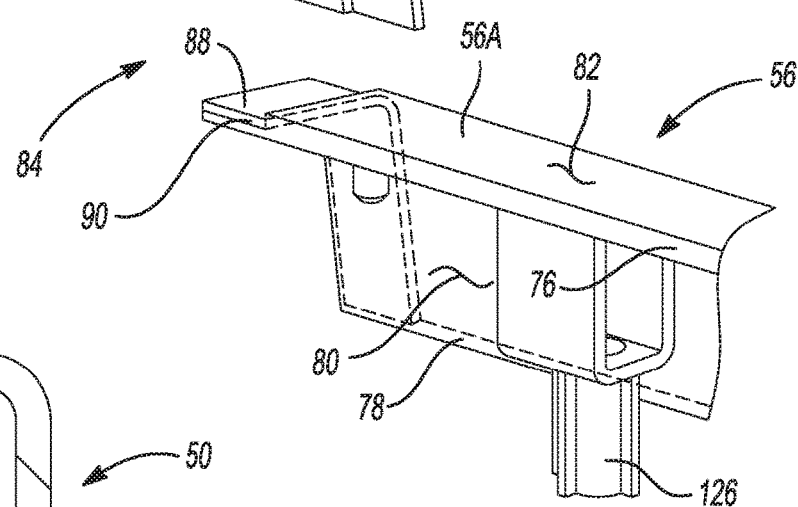
FIG. 6 is a cross-section view of a decorative strip used with the outer cover assembly.
Figure 6:
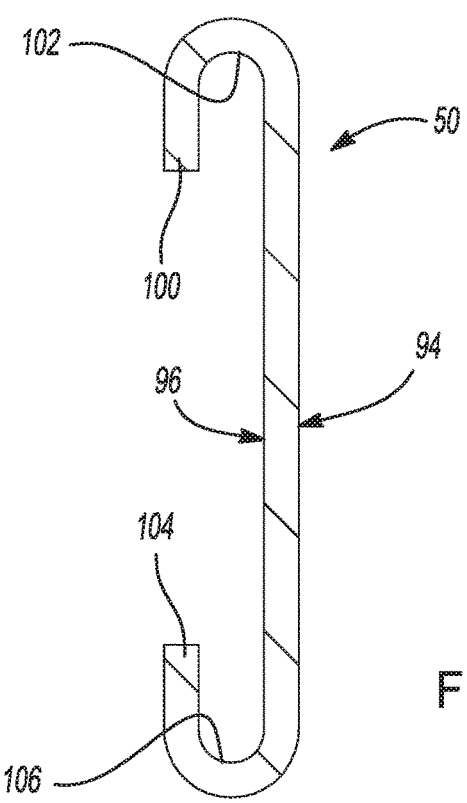

With reference to FIG. 6 and continued reference to FIG. 2, a cross-section of the decorative strip 50 is shown. The decorative strip 50 is metal and has a continuous cross-sectional shape along a length of the decorative strip 50. The decorative strip 50 includes an outer side 94 and an inner side 96. The outer side 94 is visible through the window area 92 of the modular cover 48. The decorative strip 50 includes a downward facing, upper edge 100 that defines an upper slot 102 and an upward facing, lower edge 104 that defines a lower slot 106. The upper slot 102 and lower slot 106 are disposed on the inner side 94 of the decorative strip 50.

Figure 7:
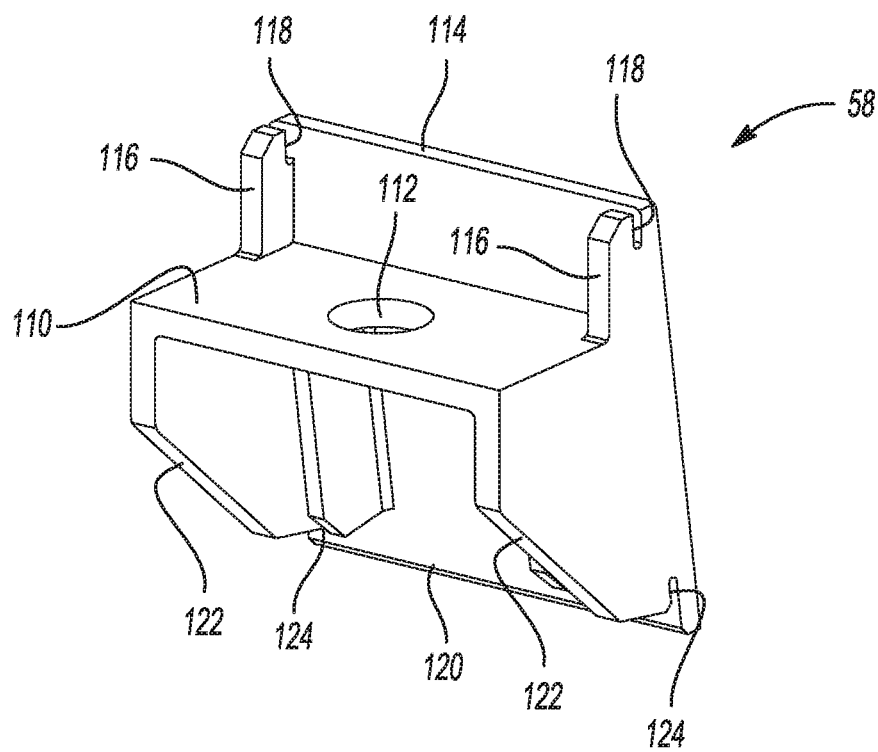
FIG. 7 is a perspective view of a first example of a connector used with the modular cover.

Turning to FIG. 7, the connector 58 will now be described. The connector 58 is configured to secure the decorative strip 50 to the modular cover 48. The connector 58 includes a flange 110 that defines a hole 112 therein. Extending in an upward direction from the flange 110 is an upper rib 114 and two upper side walls 116. The upper side walls 116 are spaced apart from the upper rib 114 to define upper recesses 118. Extending in a downward direction from the flange 110 is lower rib 120 and two lower side walls 122. The lower side walls 122 are spaced apart from the lower rib 120 to define lower recesses 124.

Figure 8:
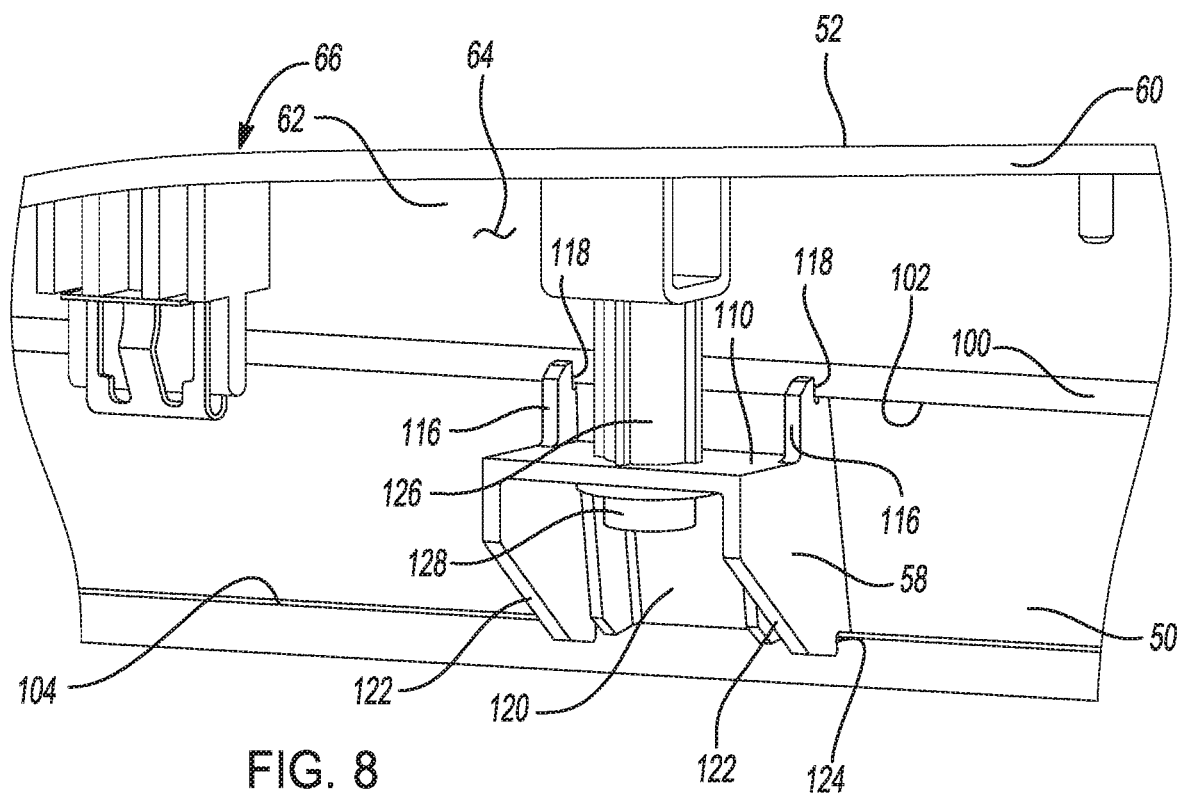
FIG. 8 is an inner perspective view of the first example of the connector used with the modular cover.

With reference to FIG. 8 and continued reference to FIGS. 6 and 7, the connector 58 will be described connected with the first cover 52 and decorative strip 50, though it should be appreciated that the connector 58 connects with the second cover 54 and third cover 56 in a substantially identical manner. The connector 58 connects to the decorative strip 50 by inserting the upper rib 114 into the upper slot 102 defined by the downward facing, upper edge 100 of the decorative strip 50. The downward facing, upper edge 100 in turn is disposed within the upper recesses 118. The lower rib 120 is inserted into the lower slot 106 defined by the upward facing, lower edge 104 of the decorative strip. The upward facing, lower edge 104 is in turn disposed within the lower recesses 124. Thus, the decorative strip 50 is secured to the connector 58. A fastener receiver 126 extends down from the inner surface 64 of the first cover 52. A fastener 128, such as a bolt or screw, extends through the hole 112 in the flange 110 and secures the connector 58 to the first cover 52.

Figure 9:
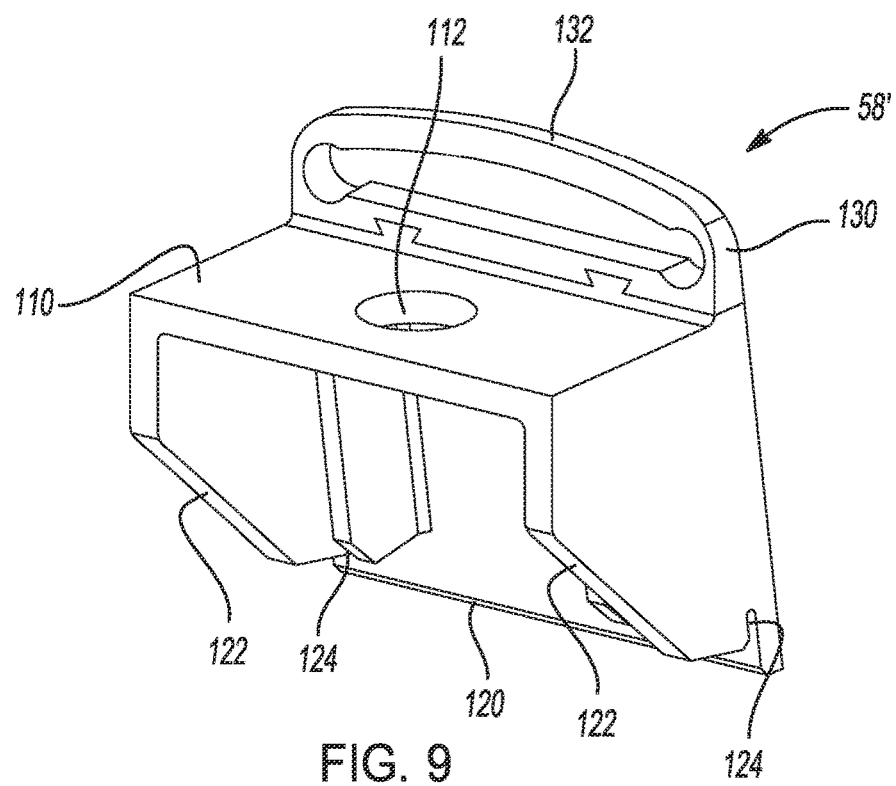
FIG. 9 is a perspective view of a second example of a connector used with the modular cover.

Turning to FIG. 9, and alternate embodiment of the connector 58 is generally indicated by reference number 58'. The connector 58' is similar to the connector 58 and therefore like components are indicated by like reference numbers. However, the upper rib 114 and upper side walls 116 of the connector 58 have been replaced by a biasing member 130. The biasing member 130 has a central portion 132 that, when deflect downwards towards the flange 110, exerts a bias force upwards.

Figure 10:
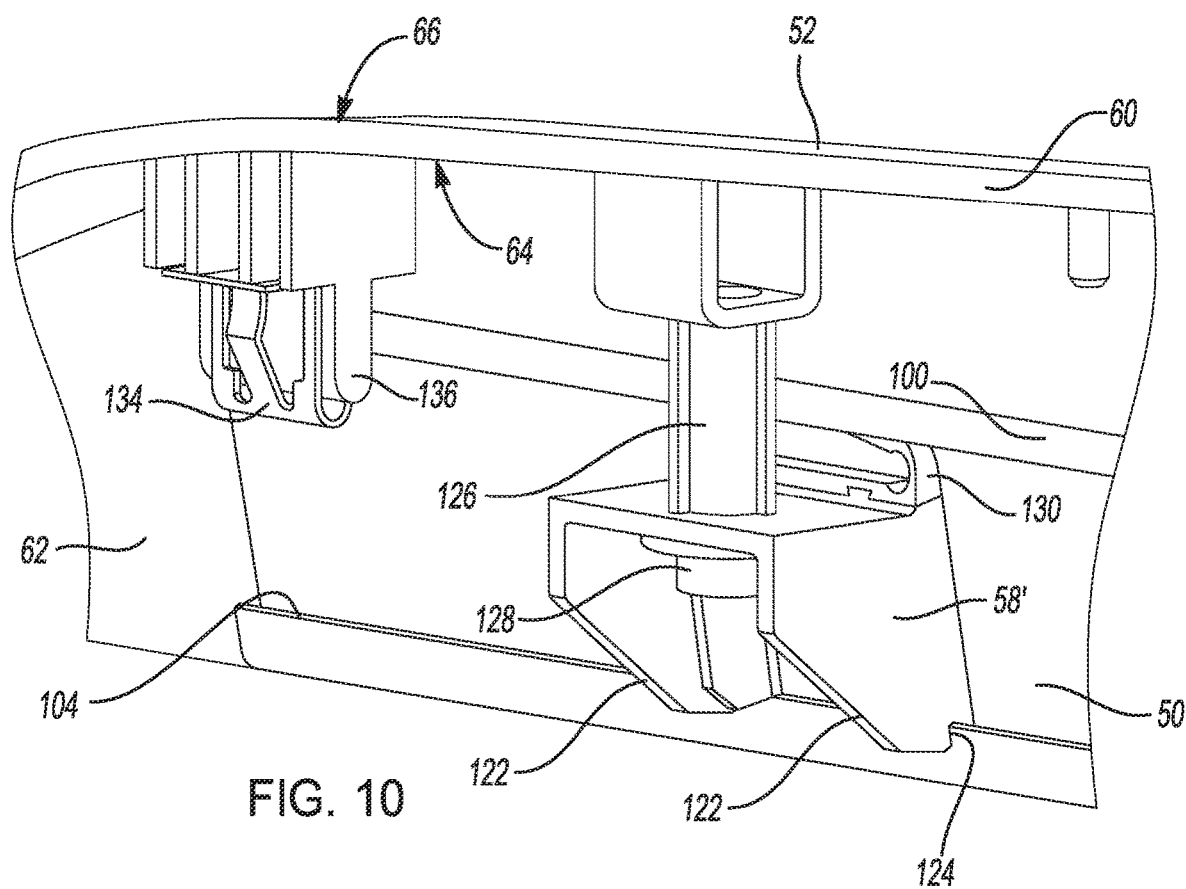
FIG. 10 is an inner perspective view of the second example of the connector used with the modular cover.

With reference to FIG. 10, and continued reference to FIGS. 9 and 6, the connector 58' operates in a similar manner to connector 58 except the biasing member 130 is disposed within the upper slot defined by the downward facing, upper edge 100 of the decorative strip 50. The central portion 132 contacts the decorative strip 50 and exerts a biasing force on the decorative strip 50.

With reference to FIGS. 3, 8 and 10, the modular outer cover assembly 24 is secured to the substrate 20 via spring clips 134 secured to ribs 136 that extend down from the inner surfaces 64, 72, 80 of the top walls 60, 68, 76 of the covers 52, 54, 56, respectively. The spring clips 134 and ribs 136 fit within slots 138 (FIG. 3) formed in a top of the substrate 20. The connectors 58, 58' fit within gaps 140 (FIG. 3) formed in the substrate 20.

Thus, when the roof rail 14 is fully assembled, the substrate 20 is completely covered on the inner surface 32 by the inner cover 22 which extends vertically from the roof 12 of the vehicle to an upper edge of the modular cover 48 and completely covered on the outer surface 34 by the modular outer cover assembly 24.

The modular outer cover assembly 24 offers several advantages. The modular outer cover assembly 24 allows the reuse of parts across multiple vehicle types since the modular cover 48 can be shortened or extended by adding or removing covers 52, 54, 56. This in turn reduces tooling and press costs for producing the roof rail 14. The connectors 58, 58' are simple and resilient allowing for easy assembly of the decorative strip 50 and modular cover 48. The decorative strip 50, being roll formed metal, can be cut to any length, and thus has lower tooling costs.

The terms "forward", "rear", "inner", "inwardly", "outer", "outwardly", "above", "upper", "below", "lower", "downward", and "upward" are terms used relative to the orientation of the motor vehicle as shown in the drawings of the present application. Thus, "forward" refers to a direction toward a front of a motor vehicle, "rearward" refers to a direction toward a rear of a motor vehicle, "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle, etc.

Additionally, in the claims and specification, certain elements are designated as "first", "second", "third", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The description of the invention is merely exemplary in nature and variations that do not depart from the gist of the invention are intended to be within the scope of the invention. Such variations are not to be regarded as a departure from the spirit and scope of the invention.

The following is claimed:

1. A roof rail connectable to a roof of a vehicle, the roof rail comprising:
a substrate connected to the roof of the vehicle; and
a modular cover having a first cover connected to the substrate and a second cover connected to the substrate, wherein the modular cover covers the substrate and wherein the first cover and the second cover define a window area, and the roof rail further comprises a decorative strip positioned behind the window area, wherein the decorative strip is connected to the modular cover.

2. The roof rail of claim 1 wherein the first cover includes a first distal end of the roof rail and the second cover is a central portion of the roof rail.

3. The roof rail of claim 1 wherein the first cover and the second cover have a first overlap joint.

4. The roof rail of claim 3 wherein the first cover includes a lower recess of the first overlap joint and the second cover includes an upper recess of the first overlap joint to receive the lower portion of the first overlap joint.

5. The roof rail of claim 4 further comprising an adhesive tape disposed on the lower recess of the first overlap joint.

6. The roof rail of claim 1 wherein the modular cover further comprises a third cover which includes a second distal end of the roof rail.

7. The roof rail of claim 6 wherein the second cover and the third cover have a second overlap joint.

8. The roof rail of claim 7 wherein the third cover includes a lower recess of the second overlap joint and the second cover includes an upper recess to receive the lower portion of the second overlap joint.

9. The roof rail of claim 8 further comprising an adhesive tape disposed on the lower recess of the second overlap joint.

10. The roof rail of claim 1 wherein the substrate includes a first portion connected to a second portion by a first connection feature.

11. The roof rail of claim 10 wherein the substrate further includes a third portion connected to the second portion by a second connection feature.

12. The roof rail of claim 1 wherein the decorative strip faces outward from the vehicle and the modular cover extends beyond ends of the window area.

13. The roof rail of claim 1 wherein the modular cover overlaps a portion of the outer decorative strip in a vertical direction relative to the vehicle.

14. The roof rail of claim 1 wherein the outer decorative strip is metal and has a continuous cross-sectional shape along a length of the outer decorative strip.

15. The roof rail of claim 1 wherein the outer decorative strip includes an inward facing, upper open edge and an inward facing, lower open edge, and the roof rail includes a connector that engages the upper open edge and the lower open edge and connects the outer decorative strip to the modular cover.

16. The roof rail of claim 15 wherein the connector includes a rib that engages one of the upper open edge and the lower open edge and includes a biasing member having a central portion that engages the other of the upper open edge and the lower open edge.

17. The roof rail of claim 15 wherein the connector includes a lower rib that engages the lower open edge and an upper rib that engages the upper open edge.

18. The roof rail of claim 15 wherein the connector includes a flange for receiving a fastener that connects the modular cover to the connector.

19. The roof rail of claim 1 further comprising an inner cover connected to the substrate facing inwardly relative to the vehicle.

20. The roof rail of claim 19 wherein the inner cover extends vertically from the roof of the vehicle to an upper edge of the modular cover.

21. The roof rail of claim 20 wherein the substrate includes a locator and the inner cover includes a slot, and wherein the locator is disposed through the slot to align the inner cover with the substrate.

22. The roof rail of claim 1 wherein the substrate includes slots on a top portion thereof and the first cover and the second cover each includes a rib having a spring clip, wherein the ribs and spring clips are disposed though the slots to connect the modular cover to the substrate.

23. A roof rail connectable to a roof of a vehicle, the roof rail comprising:
a substrate connected to the roof of the vehicle;
a modular cover having a first cover connected to the substrate and a second cover connected to the substrate, wherein the modular cover covers the substrate;

an outer decorative strip connected to the modular cover, the outer decorative strip including a downward facing, upper edge and an upward facing, lower edge; and a connector that engages the downward facing, upper edge and the upward facing, lower edge and connects the outer decorative strip to the modular cover, wherein the connector includes a rib that engages one of the downward facing, upper edge and the upward facing, lower edge and includes a biasing member having a central portion that engages the other of the downward facing, upper edge and an upward facing, lower edge.

24. The roof rail of claim 23 wherein the connector includes a lower rib that engages the upward facing, lower edge and an upper rib that engages the downward facing, upper edge.

25. The roof rail of claim 23 wherein the connector includes a flange for receiving a fastener that connects the modular cover to the connector.

26. A roof rail connectable to a roof of a vehicle, the roof rail comprising:

a modular substrate connected to the roof of the vehicle;

a modular cover having a first cover connected to the substrate, a second cover connected to the substrate, and a third cover connected to the substrate, wherein the first cover includes a first distal end of the roof rail, the second cover is a central portion of the roof rail, and the third cover includes a second distal end of the roof rail, wherein the first cover and the second cover have a first overlap joint and the second cover and the third cover have a second overlap joint, wherein the first cover includes a lower portion of the first overlap joint and the second cover includes a recess of the first overlap joint to receive the lower portion of the first overlap joint, and wherein the third cover includes a lower portion of the second overlap joint and the second cover includes a recess to receive the lower portion of the second overlap joint an outer decorative strip connected to the modular cover, the outer decorative strip including a downward facing, upper edge and an upward facing, lower edge; and a connector that engages the downward facing, upper edge and the upward facing, lower edge and connects the outer decorative strip to the modular cover wherein the connector includes a rib that engages one of the downward facing, upper edge and the upward facing, lower edge and includes a biasing member having a central portion that engages the other of the downward facing, upper edge and the upward facing, lower edge.

27. The roof rail of claim 26 wherein the connector includes a lower rib that engages the upward facing, lower edge and an upper rib that engages the downward facing, upper edge.

28. The roof rail of claim 26 wherein the connector includes a flange for receiving a fastener that connects the modular cover to the connector.

\* \* \* \* \*